(12) United States Patent
Komoda et al.

(10) Patent No.: US 6,940,087 B2
(45) Date of Patent: Sep. 6, 2005

(54) QUANTUM DEVICE

(75) Inventors: Takuya Komoda, Sanda (JP); Nobuyoshi Koshida, 3-12-8, Midori-cho, Koganei-shi, Tokyo 184-0003 (JP); Tsutomu Ichihara, Hirakata (JP)

(73) Assignees: Matsushita Electric Works, Ltd., Osaka (JP); Nobuyoshi Koshida, Tokyo (JP)

( * ) Notice: Subject to any disclaimer, the term of this patent is extended or adjusted under 35 U.S.C. 154(b) by 0 days.

(21) Appl. No.: 10/480,262

(22) PCT Filed: Mar. 7, 2003

(86) PCT No.: PCT/JP03/02688
§ 371 (c)(1),
(2), (4) Date: May 5, 2004

(87) PCT Pub. No.: WO03/077320
PCT Pub. Date: Sep. 18, 2003

(65) Prior Publication Data
US 2004/0195575 A1 Oct. 7, 2004

(30) Foreign Application Priority Data
Mar. 8, 2002 (JP) ........................................ 2002-064287

(51) Int. Cl.[7] .............................................. H01L 29/06
(52) U.S. Cl. .............................. 257/10; 257/17; 313/310
(58) Field of Search ............................. 257/10, 11, 17; 313/310

(56) References Cited

U.S. PATENT DOCUMENTS

| | | | |
|---|---|---|---|
| 5,990,605 A | 11/1999 | Yoshikawa et al. |
| 6,249,080 B1 | 6/2001 | Komoda et al. |
| 6,285,118 B1 | 9/2001 | Hatai et al. |
| 6,498,426 B1 | 12/2002 | Watabe et al. |

(Continued)

FOREIGN PATENT DOCUMENTS

| | | |
|---|---|---|
| EP | 0874384 | 10/1998 |
| EP | 0989577 | 3/2000 |
| EP | 1096532 | 5/2001 |
| EP | 1117118 | 7/2001 |
| JP | 6-90019 | 3/1994 |
| JP | 2966842 | 10/1999 |
| JP | 2001-143607 | 5/2001 |
| JP | 2001-222892 | 8/2001 |
| JP | 2003-100201 | 4/2003 |

OTHER PUBLICATIONS

English Language Abstract of JP 2001–143607.

(Continued)

*Primary Examiner*—Jerome Jackson
(74) *Attorney, Agent, or Firm*—Greenblum & Bernstein, P.L.C.

(57) ABSTRACT

Disclosed is an electron source 10 including an electron source element 10a formed on the side of one surface of an insulative substrate 1. The electron source element 10a includes a lower electrode 2, a composite nanocrystal layer 6 and a surface electrode 7. The composite nanocrystal layer 6 includes a plurality of polycrystalline silicon grains 51, a thin silicon oxide film 52 formed over the surface of each of the grains 51, a number of nanocrystalline silicons 63 residing between the adjacent grains 51, and a silicon oxide film 64 formed over the surface of each of the nanocrystalline silicons 63. The silicon oxide film 64 is an insulating film having a thickness less than the crystal grain size of the nanocrystalline silicon 63. The surface electrode 7 is formed of a carbon thin film 7a laminated on the composite nanocrystal layer 6 while being in contact therewith, and a metal thin film 7b laminated on the carbon thin film 7a.

15 Claims, 12 Drawing Sheets

U.S. PATENT DOCUMENTS

| | | |
|---|---|---|
| 6,583,578 B1 | 6/2003 | Ichihara et al. |
| 6,590,321 B1 | 7/2003 | Komoda et al. |
| 6,707,061 B2 | 3/2004 | Komoda et al. |
| 6,720,717 B2 | 4/2004 | Komoda et al. |
| 2001/0017369 A1 | 8/2001 | Komoda et al. |
| 2003/0013215 A1 | 1/2003 | Komoda et al. |
| 2003/0090211 A1 | 5/2003 | Komoda et al. |
| 2003/0102793 A1 | 6/2003 | Komoda et al. |
| 2003/0197457 A1 | 10/2003 | Komoda et al. |

OTHER PUBLICATIONS

English Language Abstract of JP 2001-222892.

English Language Abstract of JP 2001-100201.

English Language Abstract of JP 6-90019.

N. Kosida et al., "Multifunctional Properties of Nanocrystalline Porous Silicon as a Quantum-Confined Material," Materials Science and Engineering C, vol. 19, pp. 285-289, Jan. 2, 2002.

QUANTUM DEVICE

TECHNICAL FIELD

The present invention relates to a quantum device utilizing a quantum effect to be induced by electric fields, and more particularly to an electronic device using nanocrystalline silicons, such as an electron source adapted to emit electrons based on the electric field emission phenomenon or a light-emitting device adapted to emit light in response to applied electric fields.

BACKGROUND ART

In the field of quantum devices, there have heretofore been made research and development on an electronic device using nanocrystalline silicons, such as an electron source (see, for example, Japanese Patent No. 2966842) or a light-emitting device (see, for example, Japanese Patent Laid-Open Publication No. H06-90019).

This type of conventional electron source comprises a lower electrode, a surface electrode (upper electrode) formed of a metal thin film and disposed in opposed relation to the lower electrode, and a strong electric field drift layer (hereinafter referred to as "drift layer") disposed between the lower and surface electrodes. In the drift layer, electrons drift from the lower electrode toward the surface electrode in response to an electric field acting on the drift layer when a voltage is applied between the lower and surface electrodes in such a manner that the surface electrode has a higher potential than that of the lower electrode. In order to allow electrons to be emitted from the electron source, a collector electrode is disposed in a vacuum space to be opposed to the surface electrode. Then, a voltage is applied between the collector electrode and the surface electrode in such a manner that the collector electrode has a higher potential than that of the surface electrode while applying a voltage between the lower and surface electrodes in such a manner that the surface electrode has a higher potential than that of the lower electrode. In this way, electrons are injected from the lower electrode to the drift layer, and then emitted through the surface electrode after drifting in the drift layer.

The drift layer includes a number of nanocrystalline silicons. The surface-electrode is formed of a metal thin film (e.g. a gold thin film) having a thickness of about 10 nm. For example, the lower electrode of the conventional electron source is composed of a semiconductor substrate having a conductivity relatively close to that of conductor, and an ohmic electrode formed on the back surface of the semiconductor substrate. Alternatively, the lower electrode is composed of an insulative substrate (e.g. a glass substrate having an insulation performance, a ceramic substrate having an insulation performance etc.), and a conductive layer made of metal material and formed on the insulative substrate.

In the conventional light-emitting device, a pair of electrodes are provided, respectively, on both sides in the thickness direction of a luminescent layer including a number of nanocrystalline silicons. When a voltage is applied between the electrodes, the luminescent layer generates light, and the generated light is emitted through one of the electrode. This electrode is formed of a metal thin film having a thickness allowing the light to transmit therethrough. The metal thin film of the electron source or the light-emitting device is prepared through a sputtering method or the like.

Generally, it is desired that a metal thin film for use in a quantum device, such as an electron source or light-emitting device, has a reduced thickness as much as possible. However, if the metal thin film is thinned, it will have a poor coverage to a base (drift layer or luminescent layer), or will cause agglutination of its components due to surface tension and other factors, resulting in deteriorated durability of the electron source or light-emitting device. Further, in a process of vacuum-sealing the electron source, the metal thin film inevitably receives heat. Thus, the heat causes agglutination of the components of the metal thin film, and the resultingly lowered coverage to the base leads to deteriorated durability of the electron source or light-emitting device.

As one of solutions to these problems, it is conceivable to make the metal thin film of chromium having a higher coverage than that of gold. However, chromium is inherently susceptible to oxidation (or, poor in oxidation resistance). If the metal thin film is oxidized, the resultingly increased electrical resistance thereof will lead to deterioration in electron emission characteristics of the electron source or the luminescence characteristic of the light-emitting device, and to undesirably increased power consumption. In addition, chromium is strongly influenced by impurity gas (particularly, oxygen) or water residing in the vacuum space, which also leads to deteriorated durability of the electron source or light-emitting device.

SUMMARY OF THE INVENTION

In view of the above problems, it is therefore an object of the present invention to provide a quantum device, such as an electron source or a light-emitting device, having enhanced durability as compared to the conventional quantum devices.

In order to achieve this object, the present invention provides a quantum device. The quantum device includes a lower electrode, a silicon layer formed on the lower electrode including a number of nanocrystalline silicons to induce a quantum effect in response to an electric field applied thereto, and a carbon thin film formed on the silicon layer to be in contact with the nanocrystalline silicons.

In this quantum device, the surface electrode is formed of a carbon thin film which has excellent compatibility with the silicon layer including a number of nanocrystalline silicons, and high water-repellency. Thus, as compared to the conventional surface electrode made of metal, the surface electrode formed of the carbon thin film can provide enhanced coverage to the silicon layer while preventing aggregation of the components of the surface electrode. In addition, the surface electrode can prevent impurities such as oxygen or water from being mixed into the silicon layer. Furthermore, the surface electrode can have enhanced adhesion to the silicon layer as well as enhanced heat resistance and oxidation resistance. By virtue of these enhanced properties, the quantum device of the present invention can have more stable quantum effect and enhanced durability as compared to the conventional quantum devices.

The term "in contact with nanocrystalline silicons" herein is not limited to the state where nanocrystalline silicons and carbons are in direct contact with each other, but the state where nanocrystalline silicons are in indirect contact with carbons through a natural oxide film formed on the nanocrystalline silicons, or an insulating film such as an oxide film, nitride film or oxynitride film formed the nanocrystalline silicons by use of oxidizing means or nitriding means. Because, it is practically difficult to prevent formation of the natural oxide film during handling due to extremely high activity of the surface of the nanocrystalline silicon, or the insulating film is formed on the nanocrystalline silicon in some devices.

The quantum device of the present invention may further include a metal thin film formed on the carbon thin film. In this case, the metal thin film may be made of a material selected from the group consisting of gold, platinum, silver, copper, hafnium, zirconium, titanium, tantalum, iridium, niobium, chromium, aluminum, and carbide or nitride thereof.

In the quantum device of the present invention, the carbon thin film may be made of graphite or graphite-like carbon. In this case, the electrical resistance of the carbon thin film can be reduced as compared to a carbon thin film made of amorphous carbon or diamond-like carbon. Thus, a required driving voltage and power consumption can be reduced while suppressing undesirable affects from heat generation or voltage drop in the carbon thin film.

In the quantum device of the present invention, the carbon thin film may have a conducting property yielded by doping an impurity therein. In this case, the electrical resistance of the carbon thin film can be reduced as compared to a non-doped carbon thin film. Thus, a required driving voltage and power consumption can be reduced while suppressing undesirable affects from heat generation or voltage drop in the carbon thin film.

In the quantum device of the present invention, the carbon thin film may have a thickness of 5 nm or less. For example, if the quantum device is an electron source, the deterioration in electron emission efficiency can be suppressed. If the quantum device is a light-emitting device, the deterioration in optical output can be suppressed.

Further, in this carbon thin film, the lower limit of the thickness may be 1 nm or more (while setting the upper limit of the thickness at 5 nm or less). In this case, the carbon thin film can stably achieve the above effect. More specifically, if the surface electrode is formed of only the carbon thin film, the thickness of the carbon thin film may have a lower limit of 3 nm or more. If the surface electrode is formed of the carbon thin film and the metal thin film, the thickness of the carbon thin film may have an upper limit of 3 nm or less.

In the quantum device of the present invention, the carbon thin film may be a film formed under a temperature of 250° C. or more. In this case, any water absorbed in the silicon layer can be removed by heating (at 250° C. or more under vacuum) the silicon layer before the formation of the carbon thin film, to provide enhanced characteristics and stability of the quantum device. The carbon thin film can be formed in succession to the completion of the removal of the water, to keep the silicon layer from water while preventing water from being re-absorbed therein when the quantum device is taken out into atmosphere after the film formation (capping effect), so as to provide more enhanced stability of the quantum device. While the above effect may be obtained by removing water in the silicon layer through a heat treatment in a process precedent to the formation of the carbon thin film, the silicon layer including a number of nanocrystalline silicons would easily re-absorb water when it is taken out into atmosphere after the heat treatment, due to its high ability of absorbing water therein. Thus, the formation of the carbon thin film under a temperature of 250° C. or more allows the carbon thin film to be formed on the silicon layer after removing water therefrom, so as to perform an effective water-removing operation.

If the surface electrode is formed of only the carbon thin film, the quantum device of the present invention may be subjected to a heat treatment after the carbon thin film is formed therein and before the electric field is applied thereto. If the surface electrode is formed of the carbon thin film and the metal thin film, the quantum device may be subjected to a heat treatment after the carbon thin film and the metal thin film are formed therein and before the electric field is applied thereto. In this case, the carbon thin film can have enhanced film quality to provide enhanced stability and heat resistance of the quantum device. For example, in an electron source, it is fundamentally required to have a heat resistance against about 400° C. which is necessary for a vacuum-sealing process using frit glass. Thus, the heat treatment should be performed at a temperature close to 400° C. If the temperature is excessively lower than 400° C., the film quality will not be sufficiently improved. If the temperature is excessively higher than 400° C., the carbon thin film or the metal thin film will be damaged. Thus, it is desirable to perform the heat treatment at a temperature of 380 to 420° C.

The quantum device of the present invention may serve (may be used) as an electron source by arranging the silicon layer as a strong-field drift layer capable of accelerating an electrode based on a strong electric field effect. In this case, the silicon layer may be a composite nanocrystal layer which includes a polycrystalline silicon, and a number of nanocrystalline silicons residing around the grain boundary of the polycrystalline silicon. The quantum device of the present invention may also serve (may also be used) as a light-emitting device by arranging the silicon layer as a luminescent layer capable of emitting light in response to an electric field applied thereto.

BRIEF DESCRIPTION OF THE DRAWINGS

The present invention will be more sufficiently understood from the detailed description and the accompanying drawings. In the accompanying drawings, common components or elements are defined by the same reference numerals or codes.

FIGS. 7A and 7B are graphs showing respective aging characteristics of diode current, emission current and electron emission efficiency, wherein FIG. 7A shows the characteristics in an electron sources including a carbon thin film having a thickness of 0.5 nm, and FIG. 7B shows the characteristics in an electron sources including a carbon thin film having a thickness of 1.0 nm.

BEST MODE FOR CARRYING OUT THE INVENTION

Figure 1A:
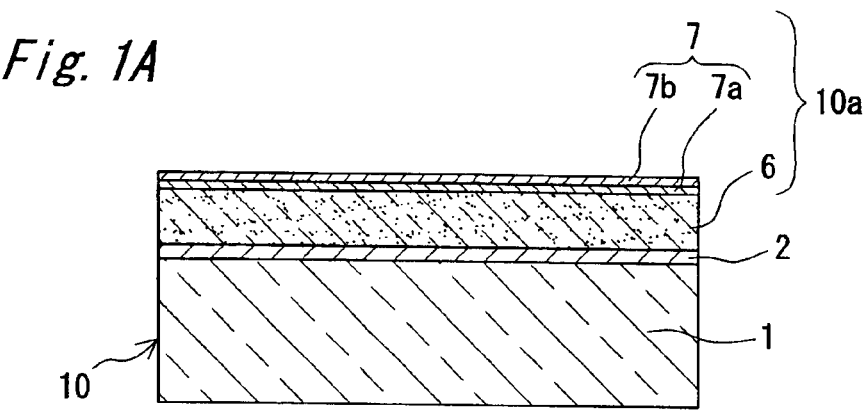
FIG. 1A is a vertical sectional view of an electron source according to the present invention.

This application is based upon and claims the benefit of priority from the prior Japanese Patent Application No. 2002-064287, the entire contents of which are incorporated herein by reference.

With reference to the accompanying drawings, several embodiments of the present invention will now be specifically described. Members common in each embodiment or members having substantially the same structure and function are defined by the same reference numerals, and duplicate descriptions will be fundamentally omitted.

(First Embodiment)

A first embodiment of the present invention will be described below. A quantum device according to the first embodiment is an electron source adapted to emit electrons based on electric fields applied thereto, as one of electronic devices utilizing nanocrystalline silicons.

As shown in FIG. 1A, the electron source 10 according to the first embodiment includes an electron source element 10a formed on the side of one surface of an insulative substrate 1 (e.g. a glass substrate having an insulation performance or a ceramic substrate having an insulation performance). The electron source element 10a includes a lower electrode 2 formed on the side of the above surface of the insulative substrate 1, a composite nanocrystal layer 6 formed on the lower electrode 2, and a surface electrode 7 formed on the composite nanocrystal layer 6. As described in detail later, the composite nanocrystal layer 6 includes a polycrystalline silicon, and a number of nanocrystalline silicons residing around the grain boundary of the polycrystalline silicon.

In the electron source element 10a, the surface electrode 7 is opposed to the lower electrode 2, and the composite nanocrystal layer is sandwiched between the surface electrode 7 and the lower electrode 2. The thickness of the lower electrode 2 is set at about 300 nm (e.g. 330 nm), and the thickness of the surface electrode 7 is set at about 10 nm. The lower electrode 2 is formed of a single-layer or multilayer metal thin film made of metal material (e.g. elemental metal such as Cr, W, Ti, Ta, Ni, Al, Cu, Au, Pt or Mo; alloy thereof; or intermetallic compound such as silicide). The composite nanocrystal layer 6 is formed by subjecting a polycrystalline silicon to a nanocrystallization process and an oxidation process.

Figure 1B:
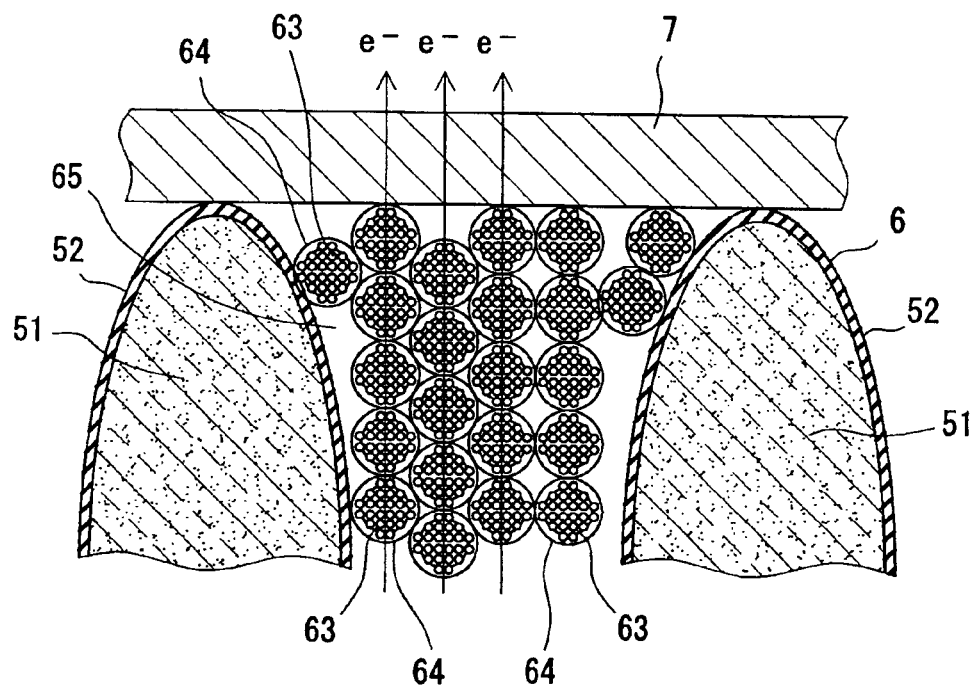
FIG. 1B is a schematic fragmentary enlarged view of the electron source in FIG. 1A.

As shown in FIG. 1B, the composite nanocrystal layer 6 includes a plurality of polycrystalline silicon grains 51, a thin silicon oxide film 52 formed over the surface of each of the grains 51, the number of nanocrystalline silicons 63 residing between the adjacent grains 51, and a silicon oxide film 64 formed over the surface of each of the nanocrystalline silicons 63. The silicon oxide film 64 is an insulating film having a thickness less than the crystal grain size of the nanocrystalline silicon 63. It is believed that the remaining region of the composite nanocrystal layer 6 other than the grains 51, the nanocrystalline silicons 63 and the silicon oxide films 52, 64 is an amorphous region 65 of amorphous silicon or partially oxidized amorphous silicon.

That is, the composite nanocrystal layer 6 includes the polycrystalline silicon, and the number of nanocrystalline silicons 63 residing around the grain boundary of the polycrystalline silicon. Each of the grains 51 extends in the thickness direction of the lower electrode 2. In the first embodiment, a plurality of composite nanocrystal layers 6 serve as a drift layer (strong electric field drift layer).

The surface electrode 7 is formed of a carbon thin film 7a deposited (laminated) on the composite nanocrystal layer 6, and a metal thin film 7b deposited on the carbon thin film 7a. The carbon thin film 7a is in contact with the nanocrystalline silicons 63 through the respective silicon oxide films 64 formed over the surface of the nanocrystalline silicons 63. As mentioned above, in this specification, the state where the carbon thin film 7a is in indirect contact with the nanocrystalline silicons 63 through the silicon oxide films 64 is also described herein by using the expression "the carbon thin film 7a is in contact with the nanocrystalline silicons 63". In view of suppressing the deterioration of electron emission efficiency, the thickness of the carbon thin film 7a in the surface electrode 7 is set in the range of 1 nm to 5 nm. Further, the total thickness of the carbon thin film 7a and the metal thin film 7b is arranged at about 10 nm.

Since the carbon thin film 7a is made of carbon belonging to Group IV elements as with silicon which is a primary component of the composite nanocrystal layer 6 serving as a base thereof, it has excellent compatibility with the composite nanocrystal layer 6, and high water-repellency. The carbon thin film 7a can also provide excellent coverage while facilitating reduction in film thickness, and prevent impurities such as oxygen or water from being mixed into the composite nanocrystal layer 6. In addition, the carbon thin film 7a has excellent adhesion with the composite nanocrystal layer 6 as well as excellent heat resistance and oxidation resistance.

The carbon thin film 7a may be formed of various types of carbon material such as amorphous carbon, graphite, graphite-like carbon, diamond or diamond-like carbon. If graphite or graphite-like carbon is used, the electrical resistance of the carbon thin film 7a will be reduced as compared to the carbon thin film made of amorphous carbon, diamond or diamond-like carbon. Thus, a required driving voltage and power consumption can be reduced while suppressing undesirable affects from heat generation or voltage drop in the carbon thin film 7a. Further, if an impurity is doped into the carbon thin film 7a to provide a conducting property therein, the electrical resistance of the carbon thin film 7a will be reduced as compared to a non-doped carbon thin film. Thus, a required driving voltage and power consumption can be reduced while suppressing undesirable affects from heat generation or voltage drop in the carbon thin film 7a.

Preferably, the metal thin film 7b is made of a material having relatively high conductivity, relatively low work function, excellent oxidation resistance and chemical stability. Such a material includes gold, platinum, silver, copper, hafnium, zirconium, titanium, tantalum, iridium, niobium, chromium, aluminum, and tungsten. Carbide or nitride of these metals may also be used. The metal thin film 7a made of these materials can have enhanced adhesion with the carbon thin film 7a to provide an improved yield ratio in the production process of the electron source.

Figure 2:
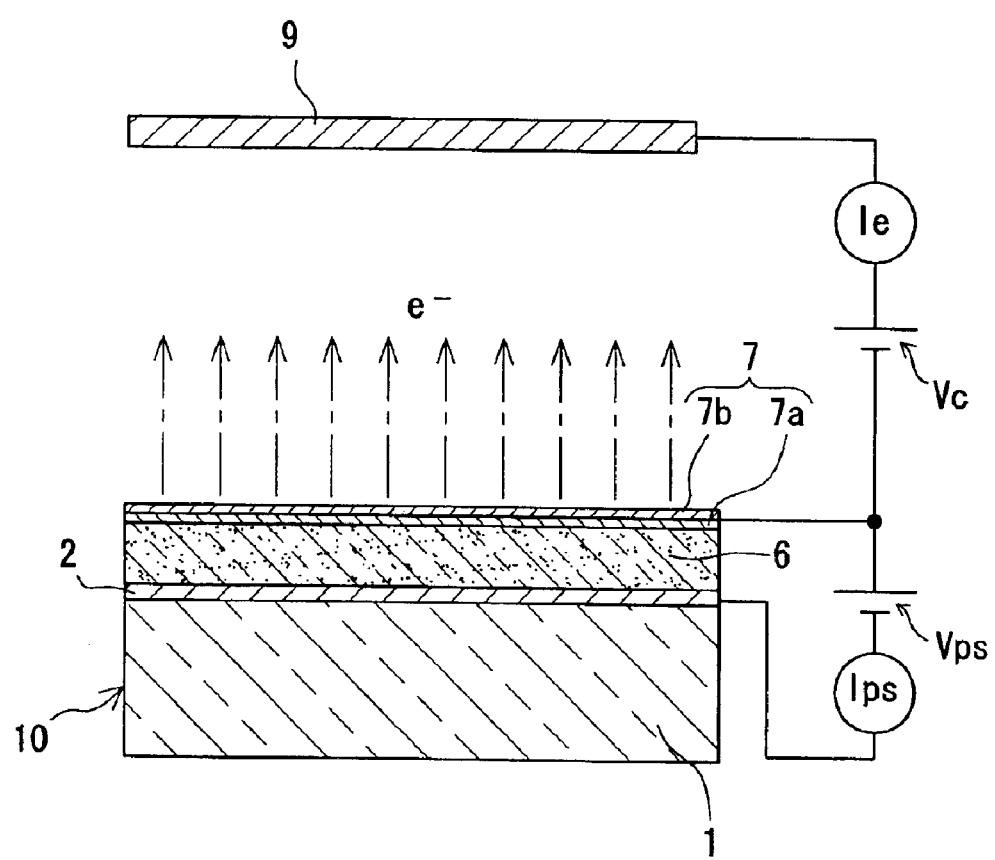
FIG. 2 is an explanatory diagram of an electron emission operation of the electron source in FIG. 1A.

As shown in FIG. 2, in order to allow electrons to be emitted from the electron source element 10a, a collector electrode 9 is disposed in opposed relation to the surface electrode 7. Then, the space between the surface electrode 7 and the collector electrode 9 is maintained in vacuum, and a DC voltage Vps is applied between the surface electrode 7 and the lower electrode 2 in such a manner that the surface electrode 7 has a higher potential than that of the lower electrode 2. Further, a DC voltage Vc is applied between the collector electrode 9 and the surface electrode 7 in such a manner that the collector electrode 9 has a higher potential than that of the surface electrode 7. The DC voltages Vps, Vc can be adequately set to allow electrons injected into the lower electrode 2 to be emitted through the surface electrode 7 after drifting in the composite nanocrystal layer 6 (one-dot chain lines in FIG. 2 indicate the flow of electrons e⁻ emitted through the surface electrode 7). It is believed that the electrons reaching the surface of the composite nanocrystal layer 6 are hot electrons, and such electrons are emitted to the vacuum space after readily tunneling through the surface electrode 7. In short, an electric field acting on the composite nanocrystal layer 6 when the surface electrode 7 has a higher potential than that of the lower electrode 2 allows electrons to drift from the lower electrode 2 toward the surface electrode 7.

Generally, in this type of electron source element 10a, a current flowing between the surface electrode 7 and the lower electrode 2 is referred to as "diode current Ips", and a current flowing between the collector electrode 9 and the surface electrode 7 is referred to as "emission current (emission electron current) Ie" (see FIG. 2). The electron emission efficiency (=(Ie/Ips)×100 [%]) is increased as the ratio of emission current Ie to diode current Ips (=Ie/Ips) is increased. Even if the DC voltage Vps to be applied between the surface electrode 7 and the lower electrode 2 is in a low range of about 10 to 20 V, the electron source 10 according to the present invention can emit electrons. Thus, the vacuum dependence of electron emission characteristics can be reduced so as to allow electrons to be stably emitted without occurrence of a so-called popping phenomenon.

It is believed that electrons are emitted from the electron source element 10a in the following model. The DC voltage Vc is applied between the collector electrode 9 and the surface electrode 7 in such a manner that the collector electrode 9 has a higher potential than that of the surface electrode 7 while applying the DC voltage Vps between the surface electrode 7 and the lower electrode 2 in such a manner that the surface electrode 7 has a higher potential than that of the lower electrode 2.

Electrons e⁻ are thermally excited, and injected from the lower electrode 2 into the composite nanocrystal layer 6. When the DC voltage Vps is applied to the composite nanocrystal layer 6, most of the generated electric field acts on the silicon oxide films 64. Thus, the electrons e⁻ injected into the composite nanocrystal layer 6 is accelerated by the strong electric field acting on the silicon oxide films 64 to drift in the region of the composite nanocrystal layer 6 between the grains toward the surface electrode 7 in the direction of the arrows at the center of FIG. 1B. When the DC voltage Vps goes up to a predetermined value (e.g. a potential equal to or greater than the work function of the metal thin film 7b of the surface electrode 7), the electrons e⁻ tunneling through the surface electrode 7 are emitted to the vacuum space. In this process, the electrons e⁻ tunnel through the nanocrystalline silicons 63 without scattering because each of the nanocrystalline silicons 63 has a size approximately equal to a Bohr radius. Thus, the electrons e⁻ accelerated by the strong electric field acting on the thin silicon oxide films 64 formed over the respective nanocrystalline silicons are emitted through the surface electrode 7 after drifting in the composite nanocrystal layer 6 without scattering.

Since heat generated in the composite nanocrystal layer 6 is released through the grains 5, the electrons can be stably emitted from the composite nanocrystal layer 6 without occurrence of the popping phenomenon during the electron emission operation. In addition, the electrons reaching the surface of the composite nanocrystal layer 6 are emitted to the vacuum space after readily tunneling through the surface electrode 7 because they would be hot electrons as mentioned above.

The electron source element 10a operable based on the above principle is generally referred to as "Ballistic electron Surface-emitting Device".

In the electron source 10 according to the first embodiment, the surface electrode 7 is formed of the carbon thin film 7a having excellent compatibility with the composite nanocrystal layer 6 serving as a base thereof and high water-repellency, and the metal thin film 7b. The carbon thin film 7a can provide excellent coverage while facilitating reduction in film thickness, and prevent impurities such as oxygen or water from being mixed into the composite nanocrystal layer 6. In addition, the carbon thin film 7a has excellent adhesion with the composite nanocrystal layer 6 as well as excellent heat resistance and oxidation resistance. Thus, the electron source 10 can prevent or suppress the conventional problems such as the peeling of the surface electrode 7 from the composite nanocrystal layer 6, the aggregation of the components of the surface electrode 7 and the oxidation of the surface electrode 7. Therefore, as compared to the conventional electron source having the surface electrode formed of only the metal electrode, the electron source 10 according to the first embodiment can have enhanced durability while suppressing deterioration in electron emission efficiency.

Figure 3A:
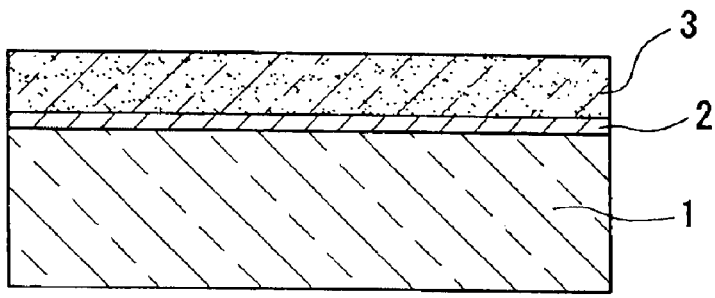
FIGS. 3A to 3D are sectional views of an electron source and intermediate products in a production process of the electron source, which show a production method of the electron source according to the present invention.

With reference to FIGS. 3A to 3D, a production method of the electron source 10 according to the first embodiment will be described below. In the production process of the electron source 10, a lower electrode 2 in the form of a laminate film formed by depositing (laminating) first and second metal layers deposited to have a given thickness (for example, a laminate film formed by depositing first and second metal layers to have a thickness of 330 nm, wherein the first metal layer is made of titanium to have a thickness of 80 nm, and the second metal layer is made of tungsten to have a thickness of 250 nm) is first formed on the side of one surface of an insulative substrate 1. Then, a non-doped polycrystalline silicon layer 3 having a given thickness (e.g. 1.5 $\mu$m) is formed on the lower electrode 2 to provide a structure as shown in FIG. 3A. The lower electrode 2 may be formed, for example, through a sputtering method or a vapor deposition method. The polycrystalline silicon layer 3 may be formed, for example, through a CVD method (LPCVD method, plasma CVD method, catalytic-CVD method etc.), a sputtering method, a CGS (Continuous Grain Silicon) method, or a method of depositing amorphous silicon and then laser-annealing the amorphous silicon.

Figure 3B:
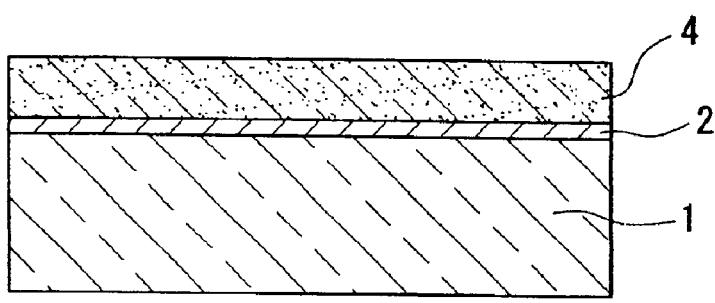

After the formation of the non-doped polycrystalline silicon layer 3, a composite nanocrystal layer 4 including polycrystalline silicon grains 51, nanocrystalline silicons 63 and amorphous silicon is formed through a nanocrystallization process to provide a structure as shown in FIG. 3B.

The nanocrystallization process is performed by using a processing bath containing an electrolytic solution which is a mixture prepared by mixing a water solution containing 55 wt % of hydrogen fluoride with ethanol at a ratio of about 1:1. In the processing bath, a given voltage is applied between a platinum electrode (not shown) and the lower electrode 2. The composite nanocrystal layer 4 is formed by supplying a given constant current to the polycrystalline silicon layer 3 while irradiating it with light.

Figure 3C:
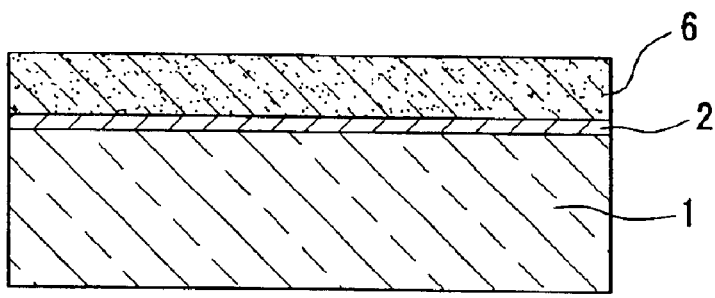

After the completion of the nanocrystallization process, a composite nanocrystal layer 6 having the structure as shown in FIG. 1B is obtained through an oxidation process to provide a structure as shown in FIG. 3C. The oxidation process is performed by using an oxidation-processing bath containing an electrolytic solution (e.g. 1 mol/l of $H_2SO_4$, 1 mol/l of $HNO_3$, aqua regia etc.). In the oxidation bath, a given voltage is applied between a platinum electrode (not shown) and the lower electrode 2 to electrochemically oxidize the composite nanocrystal layer 4. Through this process, the composite nanocrystal layer 6 including the grains 51, the nanocrystalline silicons 63, and the silicon oxide films 52, 62 is formed. The oxidation process is not limited to the electrochemical oxidation process, but any other suitable oxidation process such as a rapid-heating oxidation process may be used.

Figure 3D:
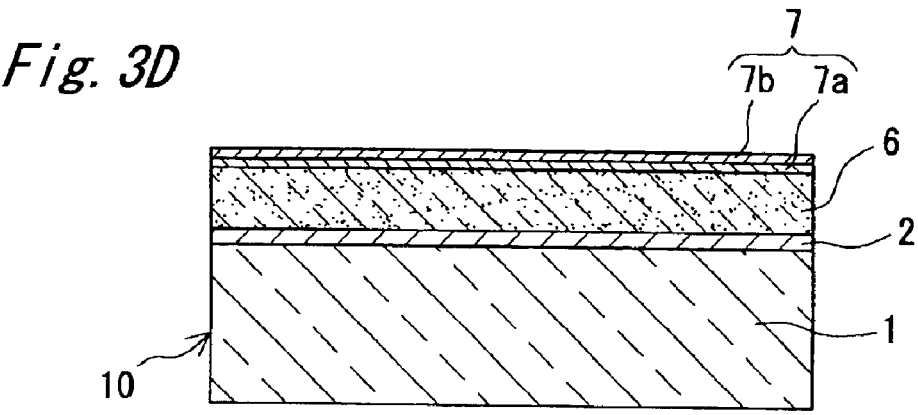

After the formation of the composite nanocrystal layer 6, a carbon thin film 7a and a metal thin film 7b are formed in turn, and a surface electrode 7 in the form of a laminate film formed by depositing (laminating) the carbon thin film 7a and the metal thin film 7b is formed on the composite nanocrystal layer 6 to provide an electron source 10 having a structure as shown in FIG. 3D. While the carbon thin film 7a may be formed through various thin-film forming methods, such as a vapor deposition method, a sputtering method, an ion plating method, a thermal CVD method or a PECVD method, it is understood that a thin-film forming method capable of forming a thin film having even film thickness and excellent coverage should be used. The metal thin film may be formed through various thin-film forming methods, such as a vapor deposition method, a sputtering method, an ion plating method or a CVD method.

The above electron-source production method allows an electron source 10 to be produced at a high yield rate while suppressing deterioration in electron emission efficiency and improving durability.

As described above, in the first embodiment, the composite nanocrystal layer 6 includes the silicon oxide films 52, 64 in addition to the polycrystalline silicon grains 51 and the nanocrystalline silicons 63. However, a silicon nitride film or silicon oxynitride film may be included as a substitute for the silicon oxide films 52, 64. In this case, instead of the oxidation process, a nitriding process or an oxynitriding process may be used.

If the electron source 10 according the first embodiment is used as an electron source for displays, a number of electron source elements 10a may be prepared by appropriately patterning the lower electrode 2, the surface electrode 7 and the composite nanocrystal layer 6, and then arranged on the side of one surface of the insulative substrate 1 in a matrix pattern. Further, in the first embodiment, the surface electrode 7 is composed of the laminate film consisting of the carbon thin film 7a and the metal thin film 7b. However, the surface electrode 7 may be formed of only the carbon thin film 7a.

(Example of First Embodiment)

Figure 4:
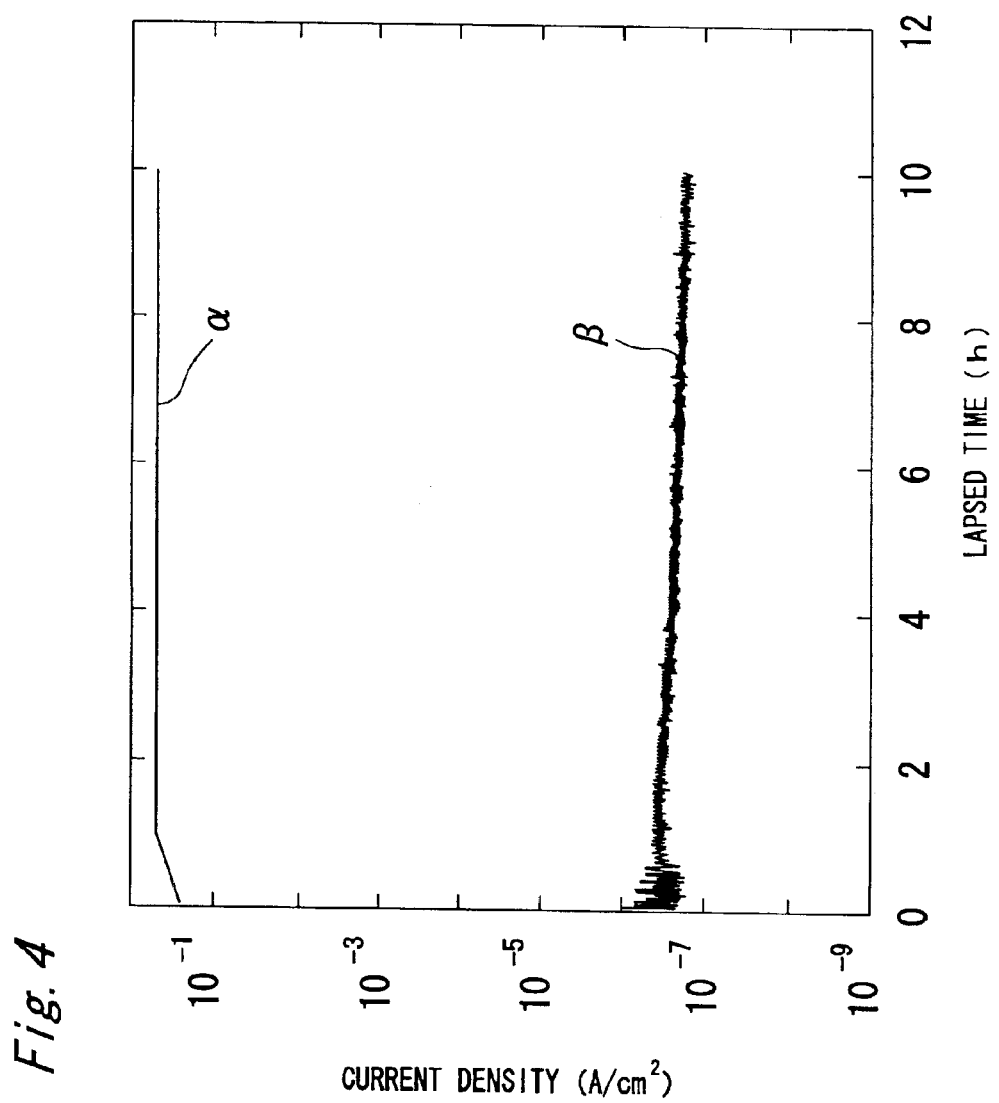
FIG. 4 is a graph showing respective aging characteristics of diode current and emission current in an electron source according to the present invention.

An electron source 10 as a first example was produced in accordance with the production method according to the first embodiment, and respective aging characteristic of diode current Ips and emission current Ie in the electron source 10 were measured. The measurement result is shown in FIG. 4. In the first example, an insulative substrate 1 is a glass substrate. A lower electrode 2 is a laminate film consisting of a titanium layer having a thickness of 80 nm and a tungsten layer having a thickness of 250 nm, which were formed through a sputtering method.

In the first example, a non-doped polycrystalline silicon layer 3 (see FIG. 3A) was formed through a plasma CVD method to have a thickness of 1.5 μm. The nanocrystallization process was performed by using an electrolytic solution prepared by mixing a water solution containing 55 wt % of hydrogen fluoride with ethanol at a ratio of about 1:1. In the electrolytic solution cooled down to 0° C., a constant current of 25 $mA/cm^2$ from a power supply was supplied between the lower electrode 2 serving as an anode and a platinum electrode serving as a cathode for 8 seconds while irradiating the principal surface of the polycrystalline silicon layer 3 with light by using a 500 W tungsten lump as a light source. An electrochemical oxidation process was used as the oxidation process. In an oxidation-processing bath containing 1 mol/l of $H_2SO_4$, a voltage of 27 V was applied between a platinum electrode (not shown) and the lower electrode 2.

A surface electrode 7 is a laminate film consisting of a carbon thin film 7a having a thickness of 2 nm and a gold thin film having a thickness of 10 nm which were formed through a sputtering method.

In measuring diode current Ips and emission current Ie, the electron source 10 was first introduced in a vacuum chamber (not shown), and a collector electrode 9 was disposed in opposed relation to the surface electrode 7 (see FIG. 2). Then, a DC voltage Vc was applied in such a manner that the collector electrode 9 has a higher potential than that of the surface electrode 7 while applying a DC voltage Vps in such a manner that the surface electrode 7 has a higher potential than that of the lower electrode 2.

FIG. 4 shows the measurement result of electron emission characteristics on the condition that a vacuum in the vacuum chamber is $1 \times 10^{-3}$ Pa, and the DC current Vps is 19 V. In FIG. 4, the horizontal axis represents a lapsed time, and the vertical axis represents a current density. Further, a indicates an aging characteristic of the current density of diode current Ips, and β indicates an aging characteristic of the current density of emission current Ie. As seen in FIG. 4, the electron source 10 of the first example exhibited an excellent aging characteristic in both the diode current Ips and the emission current Ie.

Figure 5:
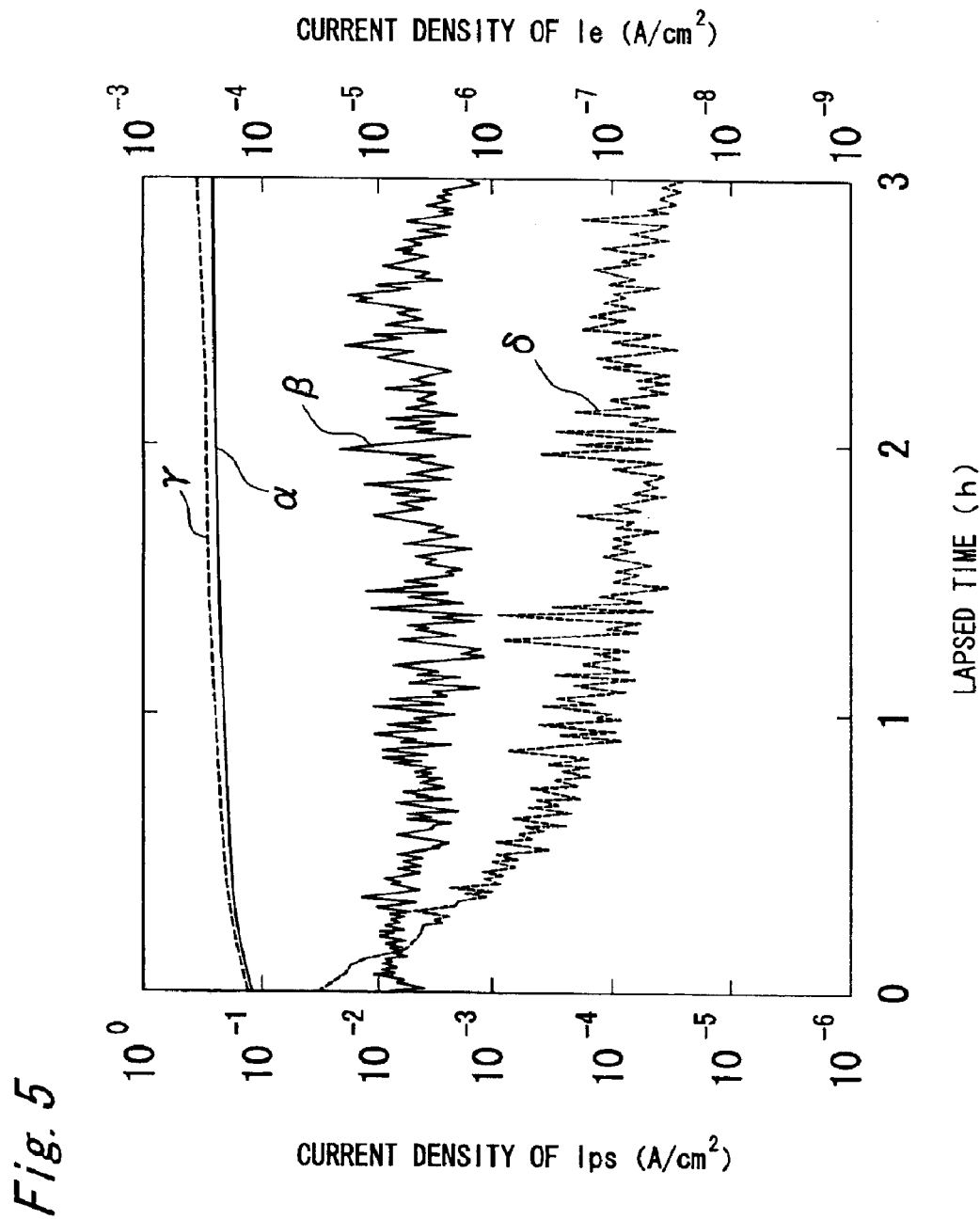
FIG. 5 is a graph showing respective aging characteristics of diode current and emission current in an electron source according to the present invention.

FIG. 5 shows respective aging characteristics of diode current Ips and emission current Ie in an emission source 10 of a second example and an electron source of a comparative example. In FIG. 5, the horizontal axis represents a lapsed time, the vertical axis on the left side representing a current density of diode current Ips, and the vertical axis on the right side representing a current density of emission current Ie. Further, α indicates an aging characteristic of the current density of diode current Ips in the electron source 10 of the second example, β indicating an aging characteristic of the current density of emission current Ie in the electron source 10 of the second example, γ indicating an aging characteristic of the current density of diode current Ips in the electron source of the comparative example, and δ indicating an aging characteristic of the current density of emission current Ie in the electron source of the comparative example. Differently from the electron source in FIG. 4, the electron source 10 of the second example used in the measurement of FIG. 5, a voltage of 32 V was applied in the oxidation process. The electron source of comparative example has a surface electrode formed of a gold thin film.

As seen in FIG. 5, the electron source 10 of the second example using the surface electrode 7 formed of the laminate film consisting of the carbon thin film 7a and the metal thin film 7b exhibited an excellent aging characteristic of the emission current Ie, as compared to the comparative example having the surface electrode formed of only the metal thin film. That is, it is proved that the electron source 10 of the second example provides enhanced aging characteristics in the emission current Ie and the electron emission efficiency, as compared to the comparative example.

Figure 6:
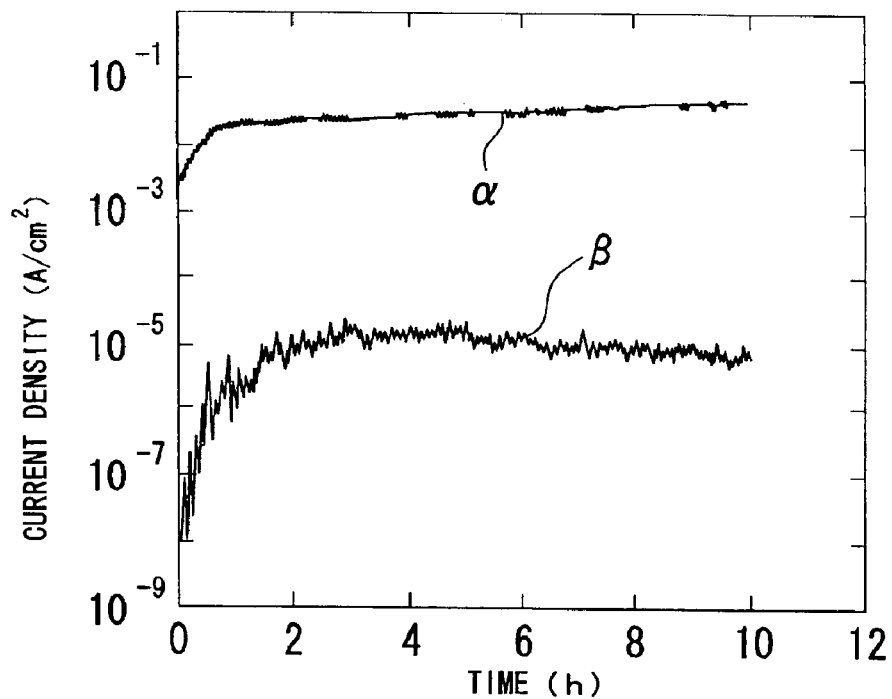
FIG. 6 is another graph showing respective aging characteristics of diode current and emission current in an electron source according to the present invention.

FIG. 6 shows respective aging characteristics of diode current Ips and emission current Ie in an electron source 10 which is different from the electron source concerning FIG. 4 in terms of the conditions of the nanocrystallization process and the oxidation process. In the nanocrystallization process for the electron source 10 concerning FIG. 6, a cycle consisting of a low current period for supplying a current of 2.5 MA/cm$^2$ for 2 seconds and a high current period for supplying a current of 25 mA/cm$^2$ for 4 seconds was repeated three times. Further, a rapid-heating oxidation process was used as the oxidation process. The electron source 10 concerning FIG. 6 exhibited an excellent stability against aging as with the electron source of the first example in FIG. 4.

In the electron source 10 of the present invention, the thickness of the carbon thin film 7a is set at 1 nm or more, and thus the carbon thin film can be stably introduced.

Figure 7A:
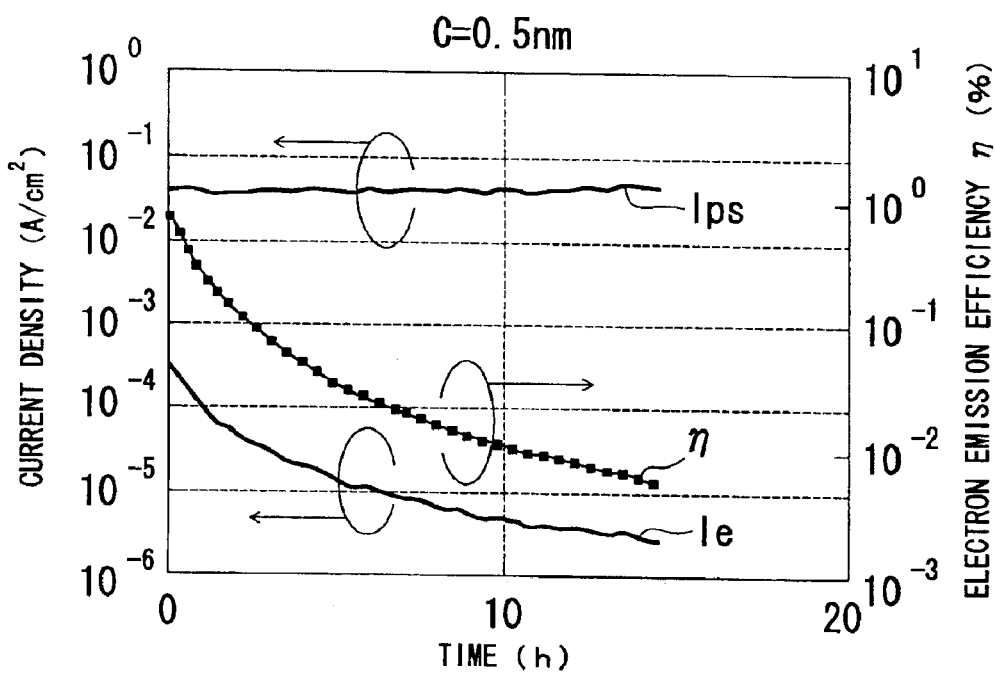
Figure 7B:
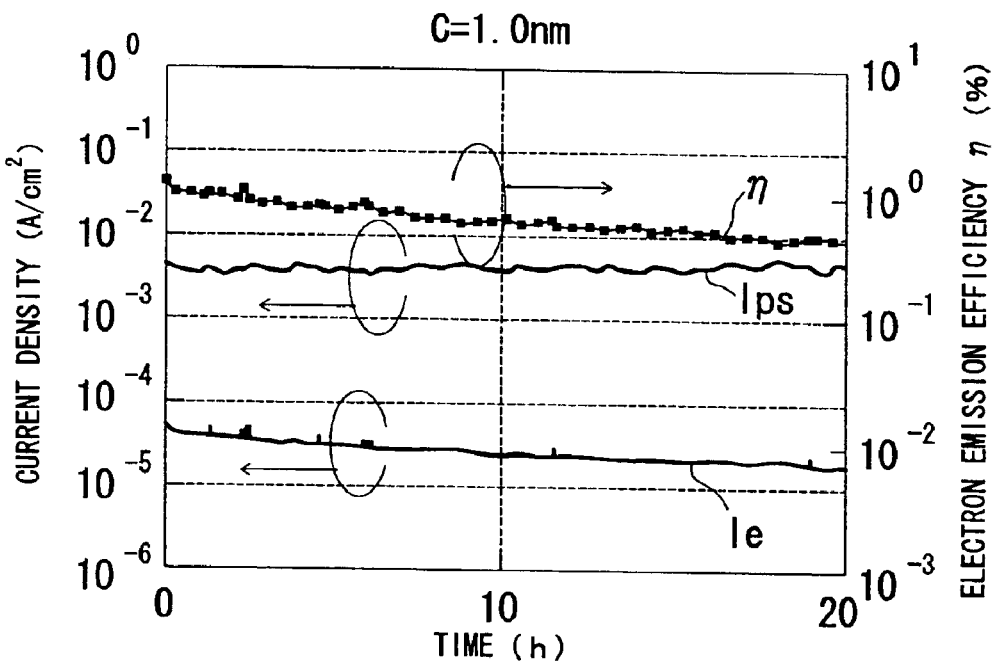

FIGS. 7A and 7B show the stability of electron emission characteristics or the stability of diode current Ips, emission current Ie and electron emission efficiency of the electron source 10, wherein FIG. 7A shows the characteristics in an electron sources including a carbon thin film 7a having a thickness of 0.5 nm, and FIG. 7B shows the characteristics in an electron sources including a carbon thin film 7a having a thickness of 1.0 nm. As seen in FIGS. 7A and 7B, while the carbon thin film 7a having a thickness of 1 nm provides a stable electron emission characteristic, the electron emission characteristic is significantly deteriorated in the carbon thin film 7a having a thickness of 0.5 nm. The reason of this deterioration would be assumed that carbons constituting the carbon thin film 7a grow in an island shape without forming a complete film when the thickness is 0.5 nm. The reason would also be assumed that even if a film is fully formed, a sufficient effect cannot be obtained due to excessively thin film thickness. Thus, when the surface electrode 7 is formed of the carbon thin film 7a and metal thin film 7b, it is desired to set the thickness of the carbon thin film 7a at 3 nm or less so as to reduce the film thickness of the surface electrode 7. On the other hand, when the surface electrode 7 is formed of only the carbon thin film 7a without the metal thin film 7b, it is desired to set the thickness of the carbon thin film 7a at 3 nm or more so as to suppress increase in electrical resistance. This condition is not limited to the electron source 10, but can also be applied to other quantum device such as a light-emitting device.

If the carbon thin film is formed under 250° C. or more, the electron source element can have enhanced characteristics or stability.

Figure 8:
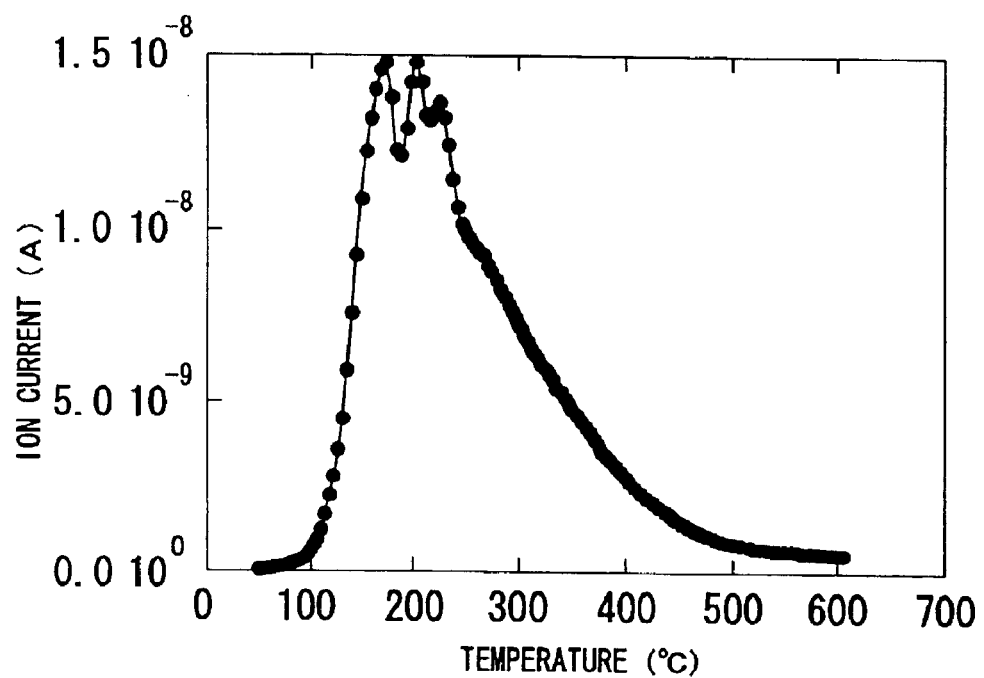
FIG. 8 is a graph showing the relationship between desorbed water content and temperature when a silicon layer used in an electron source according to the present invention is heated.

FIG. 8 shows the relationship between desorbed water content and temperature when the temperature of a silicon layer is increased to desorb water in the silicon layer (through Thermal Desorption Spectrometroy). In FIG. 8, the amount of desorbed water is represented by the value of ion current in proportion thereto. As shown in FIG. 8, some peaks of desorbed water amount can be found in the temperature range of 250° C. or less. At these peaks, water absorbed in the silicon layer is desorbed. Thus, the composite nanocrystal layer 6 (silicon layer) can be heated at 250° C. in vacuum before the formation of the carbon thin film 7a, to remove water absorbed in the composite nanocrystal layer 6 so as to provide enhanced characteristics or stability of the electron source element.

Further, the carbon thin film 7a can be formed in succession to the completion of the removal of the water in the composite nanocrystal layer 6 by heating or warming, to keep the composite nanocrystal layer 6 from water while preventing water from being re-absorbed therein when the quantum device is taken out into atmosphere after the formation of the carbon thin film 7a (capping effect), so as to provide more enhanced characteristics or stability of the electron source element 10a. While the above effect may also be obtained by removing the water through a heat treatment in a process precedent to the formation of the carbon thin film, the composite nanocrystal layer (silicon layer) including the number of nanocrystalline silicons would easily re-absorb water when an electron-source intermediate product is taken out into atmosphere after the heat treatment, due to its high ability of absorbing water therein. Thus, the formation of the carbon thin film 7a under a temperature of 250° C. or more allows the carbon thin film to be formed on the composite nanocrystal layer after removing water therefrom, so as to perform an effective water-removing operation. This operation is not limited to the electron source 10, but can also be applied to other quantum device such as a light-emitting device. In this operation, the carbon thin film may be formed after heating the composite nanocrystal layer 6 (silicon layer) at 250° C. or more to remove water therefrom, and then cooling the substrate down to room temperature.

In the production process of the electron source 10, the electron source 10 may be subjected to a heat treatment after the carbon thin film 7a and the metal thin film 7b are formed therein and before the electric field is applied to the electron source 10, to provide enhanced stability and heat resistance of the electron source element 10a or the electron source 10.

FIGS. 9A to 9D show difference in heat resistance between heat-treated and non-heat-treated electron sources.

Figure 9A:
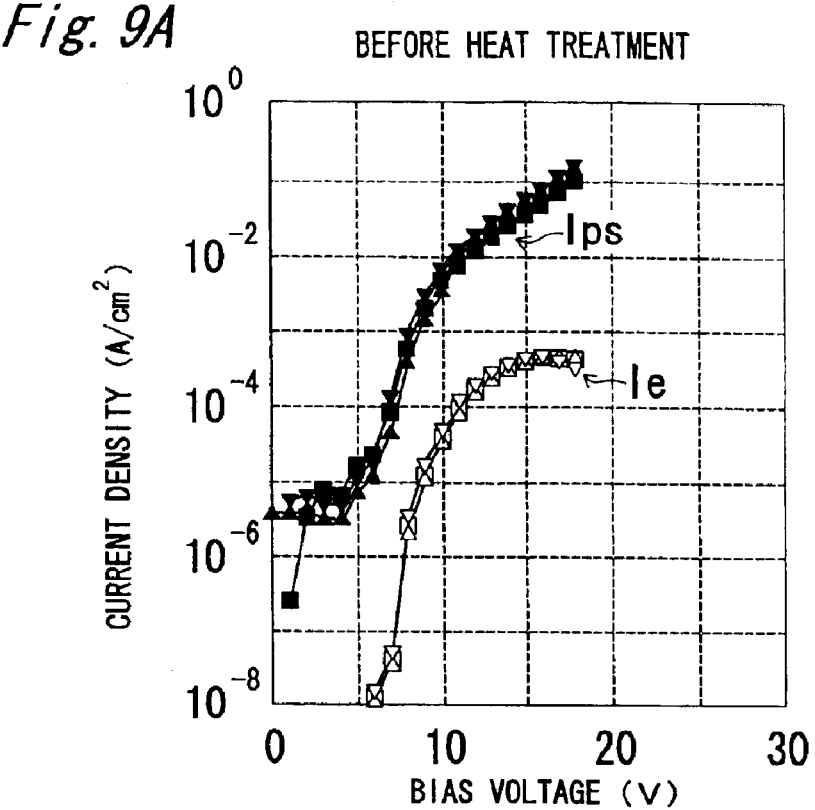
FIGS. 9A and 9B are graphs showing heat resistance in an electron source subjected to no heat treatment before an electric field is applied thereto.
Figure 9B:
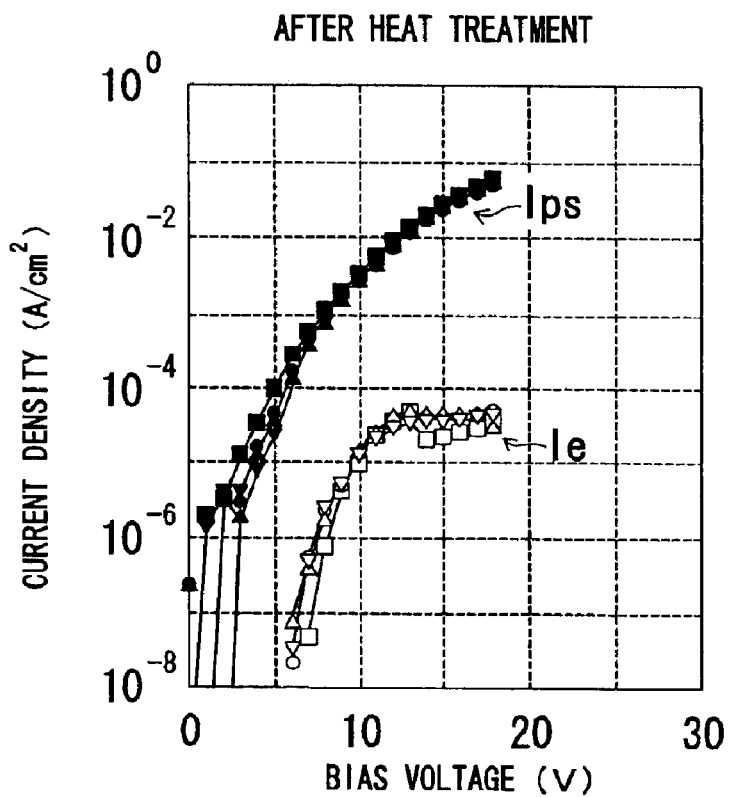

FIG. 9A shows electron emission characteristics measured under the condition that an electric field is applied to the electron source 10 after the formation of the electron source element 10a. FIG. 9B shows electron emission characteristics re-measured after the electron source 10 which has been applied with the electric field is subjected to a heat treatment under N$_2$ atmosphere at 400° C. just for 1 hour. As seen in FIGS. 9A and 9B, the deterioration of the emission current Ie shows that the electron source is damaged.

Figure 9C:
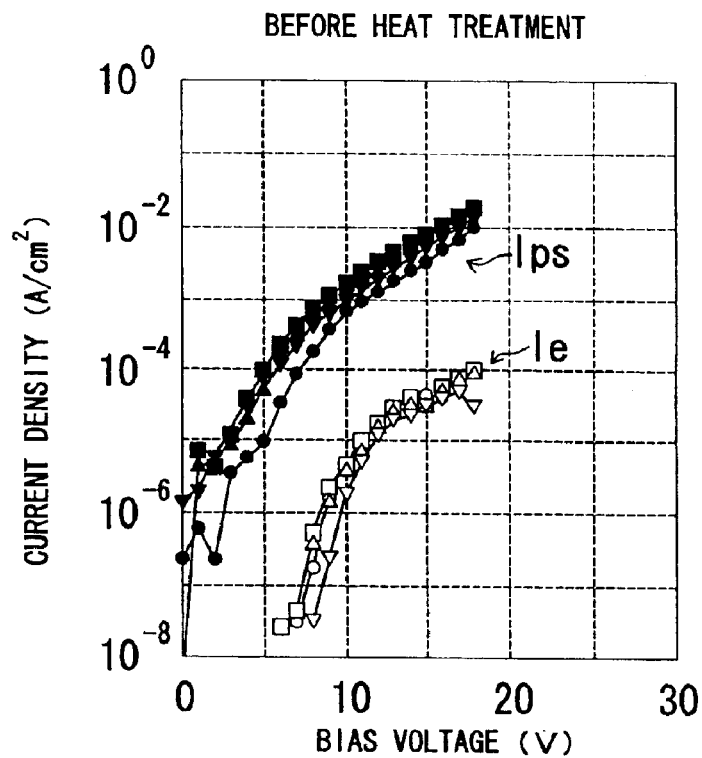
FIGS. 9C and 9D are graphs showing heat resistance in an electron source subjected to a heat treatment before an electric field is applied thereto.

FIG. 9C shows electron emission characteristics measured under the condition that the electron source 10 is subjected to a heat treatment under N$_2$ atmosphere at 400° C. just for 1 hour after the electron source element 10a is formed and before an electric field is applied to the electron source 10, and then an electric field is applied to the electron source 10. The characteristics in FIG. 9C are approximately the same as those in FIG. 9A.

Figure 9D:
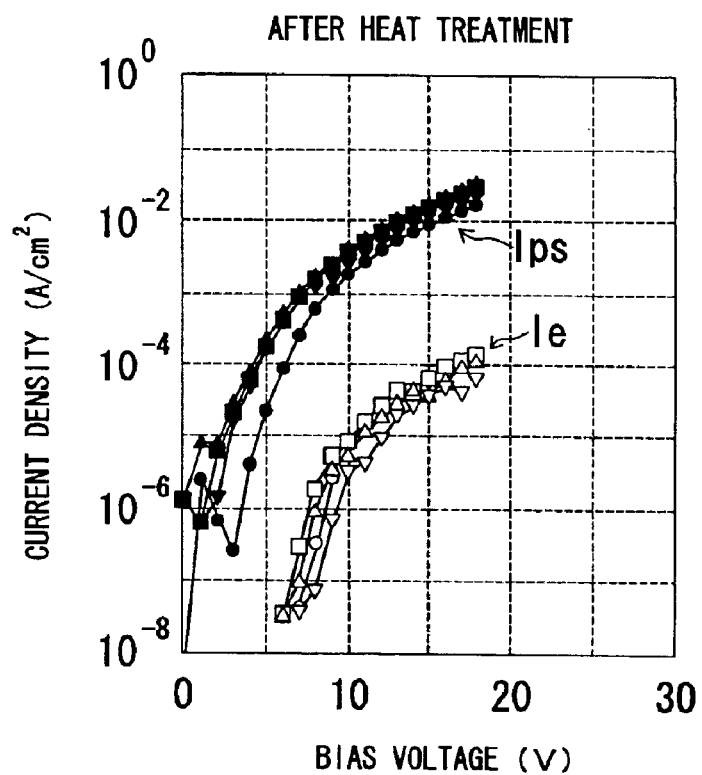

FIG. 9D shows electron emission characteristics measured under the condition that the electron source 10 subjected to the heat treatment in FIG. 9C is re-subjected to a heat treatment under $N_2$ atmosphere at 400° C. just for 1 hour, and then an electric field is applied to the electron source 10. As seen in FIGS. 9C and 9D, the characteristics in FIG. 9D are approximately the same as those in FIG. 9C, which shows that the electron source is not damaged. That is, the electron source 10 has a heat resistance against 400° C.

If an electric field is applied to a non-heat-treated electron source 10, the electron source 10 will be damaged after heat treatment, because the carbon thin film 7a unstable in film quality damage would be damaged by electrons (quanta) passing therethrough. Thus, the electron source 10 should be subjected to heat treatment before applying an electric field to the electron source 10, to provide enhanced film quality of the carbon thin film 7a and improved heat resistance of the electron source 10. If the surface electrode 7 is formed of only the carbon thin film 7a, the electron source 10 may be subjected to a heat treatment after the carbon thin film 7a is formed therein and before the electric field is applied to the electron source 10. In this way, the electron source element 10a or the electron source 10 can have enhanced stability and heat resistance as with the above case. This operation is not limited to the electron source 10, but can also be applied to other quantum device such as a light-emitting device.

From a practical standpoint, the heat resistance against 400° C. is one of critical characteristics for the electron device 10 because it is requited, for example, for a vacuum-sealing process using frit glass. Thus, the heat treatment should be performed at a temperature close to 400° C. If the temperature is excessively lower than 400° C., the film quality will not be sufficiently improved. If the temperature is excessively higher than 400° C., the carbon thin film 7a or the metal thin film 7b will be damaged. Thus, it is desirable to perform the heat treatment at a temperature of 380 to 420° C.

More specifically, the above heat treatment or the formation of the surface electro rode 7 can be performed, for example, by the following process. It is understood that this process is not limited to production of the electron source 10, but can also be applied to production of other quantum device such as a light-emitting device.

As with the above example, a lower electrode 2 made of metal is first formed on an insulative substrate 1 formed of a glass substrate. Then, a polycrystalline silicon layer 3 is formed on the lower electrode 2, for example, through a plasma CVD. The polycrystalline silicon layer 3 is subjected to a nanocrystallization process based on anodic oxidation, and a composite nanocrystal layer 6 is formed by creating oxide films therein through an electrochemical oxidation process.

Then, a carbon thin film 7a is formed through a sputtering process. In this process, an electron-source intermediate product is heated up to 250° C. under a vacuum of $1 \times 10^{-5}$ Pa or less to form a carbon thin film 7a having a thickness of 1 nm. During this process, the vacuum is once reduced due to desorption of water from the composite nanocrystal layer 6 which is heated or warmed. After substantially the entire water in the composite nanocrystal layer 6 is desorbed therefrom, the vacuum returns to the original value before heating. Then, the carbon thin film 7a is formed to have a thickness of 1 nm. After the formation of the carbon thin film 7a, the temperature is reduced while maintaining the vacuum to form a Cr layer having a thickness of 2 nm and an Au layer having a thickness of 8 nm. Then, the electron source 10 is subjected to a heat treatment under $N_2$ atmosphere at 400° C. just 1 hour before an electric field is applied to the electron source 10.

(Second Embodiment)

A second embodiment of the present invention will be described below. A quantum device according to the second embodiment is a light-emitting device adapted to emit light based on electric field applied thereto, as one of electronic devices utilizing nanocrystalline silicons.

Figure 10A:
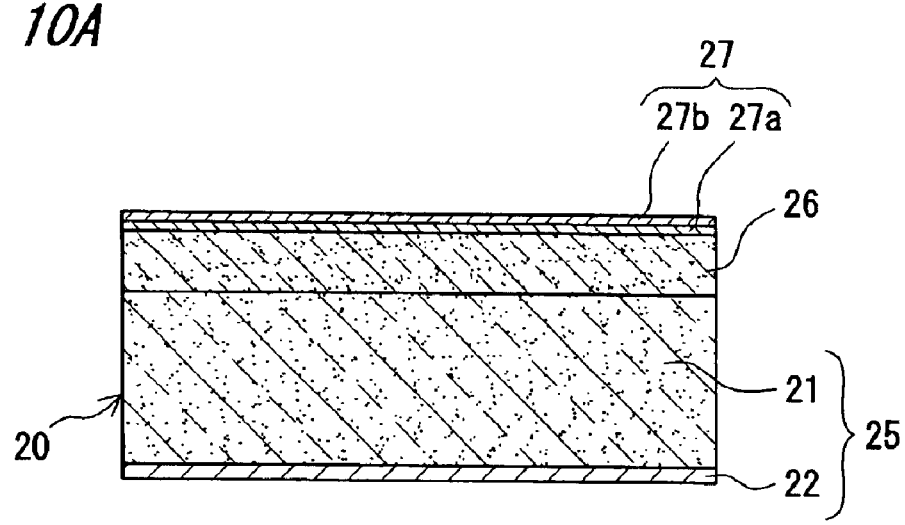
FIG. 10A is a vertical sectional view of a light-emitting device according to the present invention.

As shown in FIG. 10A, the light-emitting device 20 according to the second embodiment comprises an n-type silicon substrate 21, and an ohmic electrode 22 formed on the back surface of the n-type silicon substrate 21. A luminescent layer 26 having a number of nanocrystalline silicons 63 (see FIG. 10B) is formed on the front surface of the silicon substrate 21, and an upper electrode 27 is formed on the luminescent layer 26. In this light-emitting device 20, a lower electrode 25 is comprised of the silicon substrate 21 and the ohmic electrode 22. The luminescent layer 26 is sandwiched between the lower electrode 25 and the upper electrode 27. More specifically, the lower electrode 25 is disposed on one side in the thickness direction of the luminescent layer 26, and the upper electrode 27 is disposed on the other side, so that the lower electrode 25 and the upper electrode 27 act as a pair of electrodes. In this light-emitting device 20, light generated in the luminescent layer 26 is output outside through the upper electrode 27. The thickness of the upper electrode 27 is set at about 10 nm.

The luminescent layer 26 is formed by subjecting a polycrystalline silicon layer or a silicon layer to a nanocrystallization process and an oxidation process.

Figure 10B:
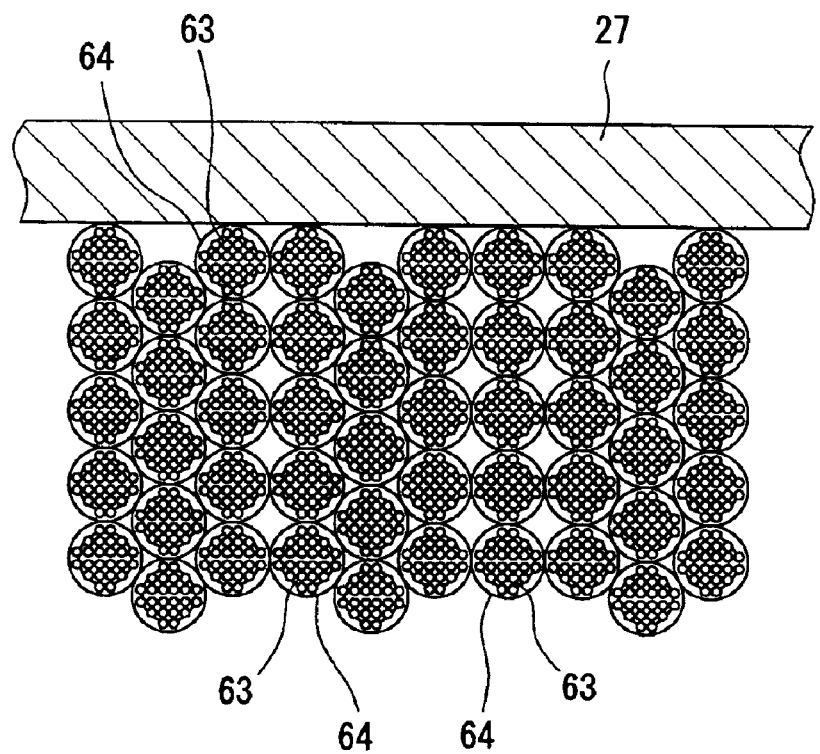
FIG. 10B is a schematic fragmentary enlarged view of the light-emitting device in FIG. 10A.

As shown in FIG. 10B, the luminescent layer 26 includes a plurality of polycrystalline silicon grains 51, a thin silicon oxide film 52 formed over the surface of each of the grains 51, the number of nanocrystalline silicons 63 residing between the adjacent grains 51, and a silicon oxide film 64 formed over the surface of each of the nanocrystalline silicons 63. The silicon oxide film 64 is an insulating film having a thickness less than the crystal grain size of the nanocrystalline silicon 63. It is believed that the remaining region of the luminescent layer 26 other than the grains 51, the nanocrystalline silicons 63 and the silicon oxide films 52, 64 is formed of amorphous silicon or partially oxidized amorphous silicon. That is, the luminescent layer 26 includes the polycrystalline silicon, and the number of nanocrystalline silicons 63 residing around the grain boundary of the polycrystalline silicon. Each of the grains 51 extends in the thickness direction of the silicon substrate 21.

The upper electrode 27 is formed of a carbon thin film 27a laminated on the luminescent layer 26, and a metal thin film 27b laminated on the carbon thin film 27a. The carbon thin film 27a is in contact with the nanocrystalline silicons 63 through the respective silicon oxide films 64 formed over the surface of the nanocrystalline silicons 63. In view of suppressing absorption of light generated in the luminescent layer 26 to prevent the deterioration of optical output, the thickness of the carbon thin film 27a in the upper electrode 27 is set in the range of 1 nm to 5 nm. Further, the total thickness of the carbon thin film 27a and the metal thin film 27b is arranged at about 10 nm.

For the same reasons as those of the carbon thin film 27a in the first embodiment, the carbon thin film 27a has excellent compatibility with the luminescent layer 26, and high water-repellency. The carbon thin film 27a can also provide excellent coverage while facilitating reduction in film thickness, and prevent impurities such as oxygen or water from being mixed into the luminescent layer 26. In addition, the carbon thin film 27a has excellent adhesion with the luminescent layer 26 as well as excellent heat resistance and oxidation resistance.

The material of the carbon thin film 27a may be selected on the same basis as that of the carbon thin film 7a in the first embodiment. In this case, it is understood that the same effects as those in the first embodiment can be obtained. Further, if an impurity is doped into the carbon thin film 27a to provide a conducting property therein, the electrical resistance of the carbon thin film 27a will be reduced. Thus, a required driving voltage and power consumption can be reduced while suppressing undesirable affects from heat generation or voltage drop in the carbon thin film 27a, as with the carbon thin film 7a in the first embodiment.

The material of the metal thin film 27b may be selected on the same basis as that of the metal thin film 7b in the first embodiment. In this case, it is understood that the same effects as those in the first embodiment can be obtained.

In order to allow the light-emitting device 20 as shown in FIG. 10A to emit light therefrom, a voltage may be applied between the upper electrode 27 and the lower electrode 25. The luminescent layer 26 generates light in response to an electric field acting thereon when the voltage is applied between the upper electrode 27 and the lower electrode 25. The light generated in the luminescent layer 26 is emitted outside after transmitting through the upper electrode 27.

In the light-emitting device 20 according to the second embodiment, the upper electrode 27 is formed of the carbon thin film 27a having excellent compatibility with the luminescent layer 26 serving as a base thereof and high water-repellency, and the metal thin film 27b. The carbon thin film 27a can provide excellent coverage while facilitating reduction in film thickness, and prevent impurities such as oxygen or water from being mixed into the luminescent layer 26. In addition, the carbon thin film 27a has excellent adhesion with the luminescent layer 26 as well as excellent heat resistance and oxidation resistance. Thus, the light-emitting device 20 can prevent or suppress the conventional problems such as the peeling of the upper electrode 27 from the luminescent layer 26, the aggregation of the components of the upper electrode 27 and the oxidation of the upper electrode 27. Therefore, as compared to the conventional light-emitting device having the upper electrode formed of only the metal electrode, the light-emitting device 20 according to the second embodiment can have enhanced durability while suppressing deterioration in optical output.

With reference to FIGS. 11A to 11D, a production method of the light-emitting device 20 according to the second embodiment will be described below.

Figure 11A:
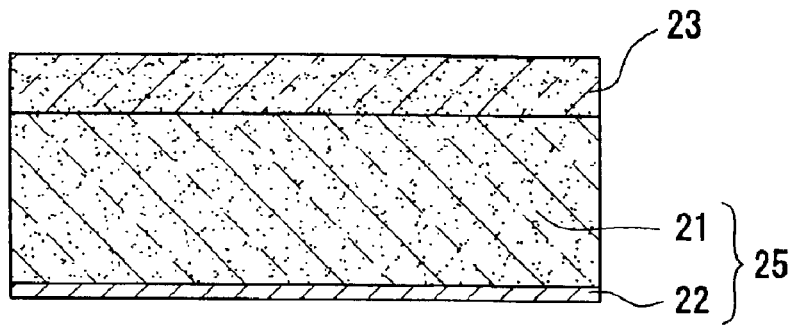
FIGS. 11A to 11D are sectional views of a light-emitting device and intermediate products in a production process of the light-emitting device, which show a production method of the light-emitting device according to the present invention.

In the production process of the light-emitting device 20, an ohmic electrode 22 is first formed on the back surface of a silicon substrate 21. Then, a non-doped polycrystalline silicon layer 23 having a given thickness (e.g. 1.5 μm) is formed on the principal surface of the silicon substrate 21 to provide a structure as shown in FIG. 11A. The non-doped polycrystalline silicon layer 23 may be formed through the same method as that of the polycrystal silicon layer 3 in the first embodiment.

Figure 11B:
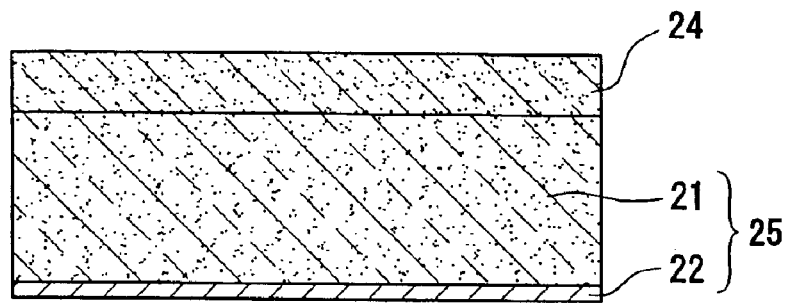
Figure 11C:
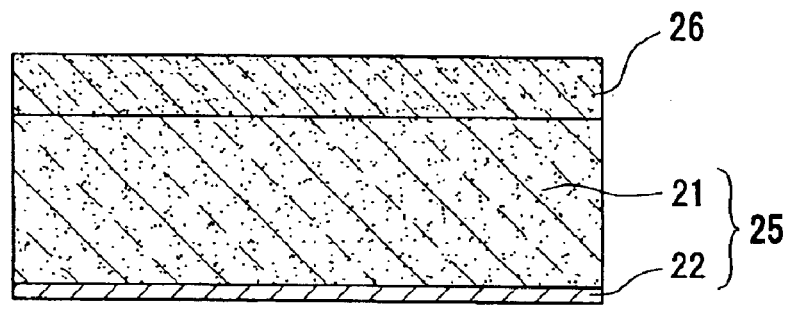

After the formation of the non-doped polycrystalline silicon layer 23, a nanocrystal layer 24 including a polycrystalline silicon, nanocrystalline silicons and amorphous silicons is formed through a nanocrystallization process to provide a structure as shown in FIG. 11B. The nanocrystallization process may be the same as that in the first embodiment.

After the completion of the nanocrystallization process, a luminescent layer 26 having the structure as shown in FIG. 10B is obtained through an oxidation process to provide a structure as shown in FIG. 1C. The oxidation process may be the same as that in the first embodiment.

Figure 11D:
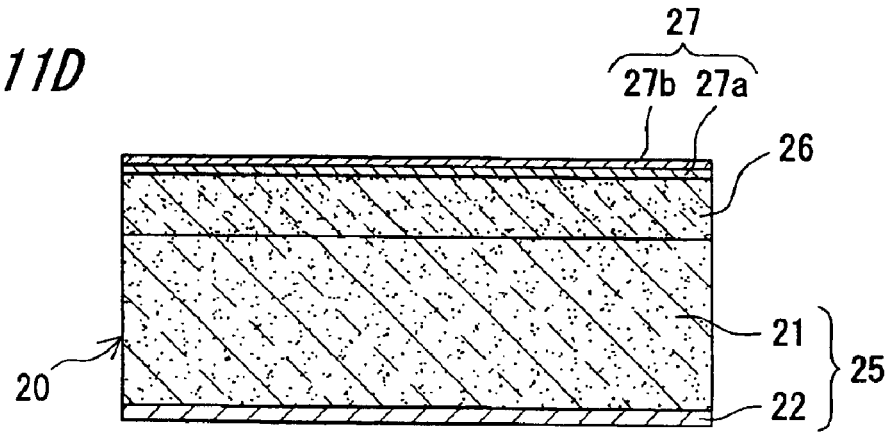

After the formation of the luminescent layer 26, a carbon thin film 27a and a metal thin film 27b are formed in turn. Through this process, an upper electrode 27 in the form of a laminate film formed of the carbon thin film 27a and the metal thin film 27b is formed on the luminescent layer 26 to provide a light-emitting device 20 having a structure as shown in FIG. 11D. The respective methods of forming the carbon thin film 27a and the metal thin film 27b may be the same as those of forming the carbon thin film 7a and the metal thin film 7b in the first embodiment, respectively.

The above production method allows a light-emitting device 20 to be produced at a high yield rate while suppressing deterioration in optical output and improving durability.

In the second embodiment, the luminescent layer 26 includes the silicon oxide films 52, 64 in addition to the polycrystalline silicon grains 51 and the nanocrystalline silicons 63. However, a silicon nitride film or silicon oxynitride film may be included as a substitute for the silicon oxide films 52, 64. In this case, instead of the oxidation process, a nitriding process or an oxynitriding process may be used.

In the second embodiment, the upper electrode 27 is composed of the laminate film consisting of the carbon thin film 27a and the metal thin film 27b. However, the supper electrode 27 may be formed of only the carbon thin film 27a.

In the second embodiment, the lower electrode 25 is composed of the silicon substrate 21 and the ohmic electrode 22. Alternatively, the lower electrode may be a single-layer or multilayer metal thin film made of metal and formed on the insulative substrate, as in the first embodiment.

In the light-emitting device 20, while the luminescent layer 26 includes at least the nanocrystalline silicons 63, the grains 51 are not essentially included therein. In this case, a part of the principle surface of the silicon substrate 21 may be subjected to the nanocrystallization process and the oxidation process without forming the polycrystalline silicon layer 23 on the principal surface of the silicon substrate 21. Further, the silicon oxide films 52, 62 may be not essentially included. In this case, the oxidation process may be omitted, or the silicon oxide films 52, 62 may be removed after the formation of the silicon oxide films 52, 62.

In the second embodiment, the non-doped polycrystalline silicon layer 23 is formed on the n-type silicon substrate 21. Instead of this structure, an n-type polycrystalline silicon layer may be used as the polycrystalline silicon layer 23. Alternatively, a p-type silicon substrate and a p-type polycrystalline silicon layer may be used as the silicon substrate 21 and the polycrystalline silicon layer 23, respectively.

(Example of Second Embodiment)

A light-emitting device 20 as one example was actually produced in accordance with the production method according to the second embodiment, and a voltage-current characteristic and electroluminescence intensity (EL intensity) were measured. The measurement result is shown in FIG.

12. In this example, an n-type silicon substrate having a resistivity of 0.1 Ω cm was used as the silicon substrate 21.

A non-doped polycrystalline silicon layer 23 (see FIG. 11A) was formed through a plasma CVD method to have a thickness of 1.5 μm. The nanocrystallization process was performed by using an electrolytic solution prepared by mixing a water solution containing 55 wt % of hydrogen fluoride with ethanol at a ratio of about 1:1. In the electrolytic solution cooled down to 0° C., a constant current of 25 mA/cm² from a power supply was supplied between the lower electrode 25 serving as an anode and a platinum electrode serving as a cathode for 8 seconds while irradiating the principal surface of the polycrystalline silicon layer 23 with light by using a 500 W tungsten lump as a light source. An electrochemical oxidation process was used as the oxidation process. In an oxidation-processing bath containing 1 mol/l of $H_2SO_4$, a voltage of 27 V was applied between a platinum electrode (not shown) and the lower electrode 25.

An upper electrode 27 is a laminate film consisting of a carbon thin film 27a having a thickness of 2 nm and a gold thin film having a thickness of 10 nm which were formed through a sputtering method.

Figure 12:
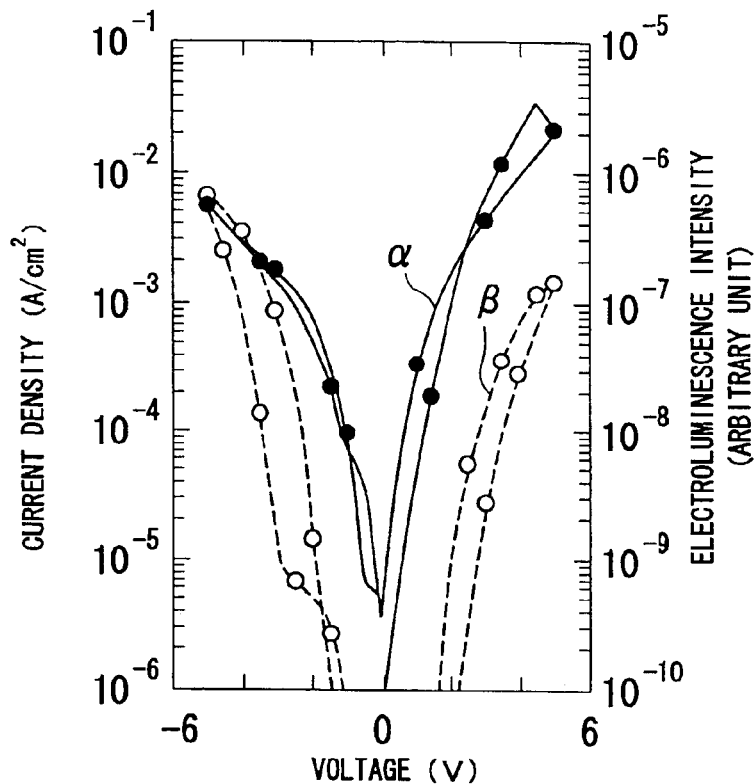
FIG. 12 shows a graph showing respective change characteristics of current density and electroluminescence intensity with respect to voltage in a light-emitting device according to the present invention.

In FIG. 12 showing characteristics of the light-emitting device 20 of this example, the horizontal axis represents a voltage applied between the upper electrode 27 and the lower electrode 25, and the vertical axis on the left side representing a current density of a current flowing between the upper electrode 27 and the lower electrode 25, and the vertical axis on the right side representing an electroluminescence intensity. Further, a indicates a dependence of the current density of the current flowing between the electrodes 27, 25 to the applied voltage, and β indicates a dependence of the electroluminescence intensity to the applied voltage.

As seen in FIG. 12, the light-emitting device 20 of this example provided excellent optical output, irrespective of the polarity of the voltage applied between the upper electrode 27 and the lower electrode 25.

Figure 13:
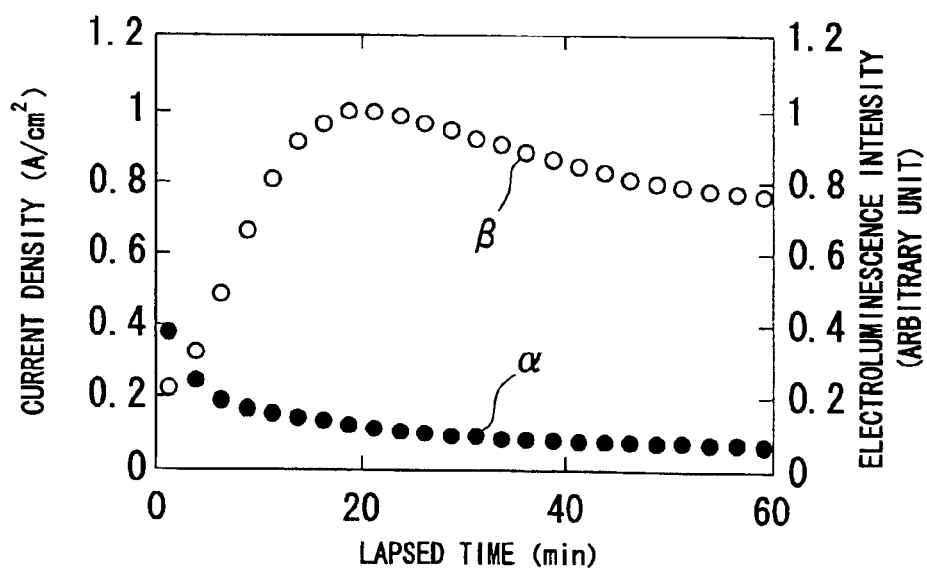
FIG. 13 shows a graph showing respective aging characteristics of current density and electroluminescence intensity in a light-emitting device according to the present invention.

FIG. 13 shows a graph showing respective aging characteristics of the current density of the current flowing between the electrodes 27, 25, and the electroluminescence intensity. In FIG. 13, the horizontal axis represents a lapsed time, the vertical axis on the left side representing the current density of the current flowing between the upper electrode 27 and the lower electrode 25, and the vertical axis on the right side representing the electroluminescence intensity. Further, a indicates an aging characteristic of the current density of the current flowing between the upper electrode 27 and the lower electrode 25, and β indicates an aging characteristic of the electroluminescence intensity. As seen in FIG. 13, the light-emitting device 20 of this example provided excellent aging characteristics. While not shown in FIG. 13, the light-emitting device 20 of this example also has excellent aging characteristics in both the current density and the electroluminescence intensity, as compared to the conventional light-emitting device having the upper electrode 27 formed of only the metal thin film.

While the present invention has been described by reference to specific embodiments, various modifications and alterations will become apparent to those skilled in the art. Therefore, it is intended that the present invention is not limited to the illustrative embodiments herein, but only by the appended claims and their equivalents.

INDUSTRIAL APPLICABILITY

As mentioned above, the quantum device according to the present invention is useful for providing improved adhesion of the surface electrode with the silicon layer, heat resistance and oxidation resistance as well as enhanced durability, and suitable as electron sources or light-emitting devices.

What is claimed is:

1. A quantum device comprising:
   a lower electrode;
   a silicon layer formed on said lower electrode, said silicon layer including a number of nanocrystalline silicons to induce a quantum effect in response to an electric field applied thereto; and
   a carbon thin film formed on said silicon layer to be in contact with the nanocrystalline silicons.

2. The quantum device according to claim 1, further comprising a metal thin film formed on said carbon thin film.

3. The quantum device according to claim 2, wherein said metal thin film is composed of a material selected from the group consisting of gold, platinum, silver, copper, hafnium, zirconium, titanium, tantalum, iridium, niobium, chromium, aluminum, and carbide or nitride thereof.

4. The quantum device according to claim 1, wherein said carbon thin film is composed of graphite or graphite-like carbon.

5. The quantum device according to claim 1, wherein said carbon thin film has a conducting property yielded by doping an impurity therein.

6. The quantum device according to claim 1, wherein said carbon thin film has a thickness of 5 nm or less.

7. The quantum device according to claim 6, wherein the thickness of said carbon thin film is 1 nm or more.

8. The quantum device according to claim 1, wherein said carbon thin film is a film formed under a temperature of 250° C. or more.

9. The quantum device according to claim 1, which is subjected to a heat treatment after said carbon thin film is formed therein and before the electric field is applied thereto.

10. The quantum device according to claim 2, which is subjected to a heat treatment after said carbon thin film and said metal thin film are formed therein and before the electric field is applied thereto.

11. The quantum device according to claim 9, wherein said heat treatment is performed at a temperature of 380 to 420° C.

12. The quantum device according to claim 10, wherein said heat treatment is performed at a temperature of 380 to 420° C.

13. The quantum device according to claim 1, wherein said silicon layer is a strong electric field drift layer capable of accelerating electrons based on a strong electric field effect, wherein said quantum device serves as an electron source.

14. The quantum device according to claim 13, wherein said silicon layer is a composite nanocrystal layer which includes a polycrystalline silicon, and a number of nanocrystalline silicons residing around the grain boundary of said polycrystalline silicon.

15. The quantum device according to claim 1, wherein said silicon layer is a luminescent layer capable of generating light in response to an electric field applied thereto, wherein said quantum device serves as a light-emitting device.

* * * * *